July 27, 1965
J. S. HYDE
3,197,692
GYROMAGNETIC RESONANCE SPECTROSCOPY
Filed April 2, 1962
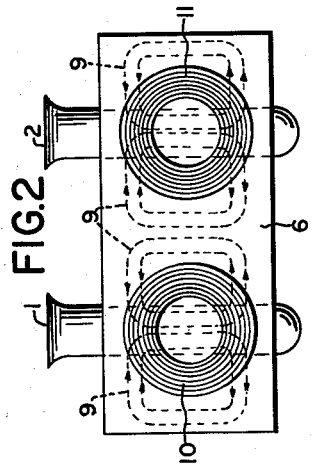
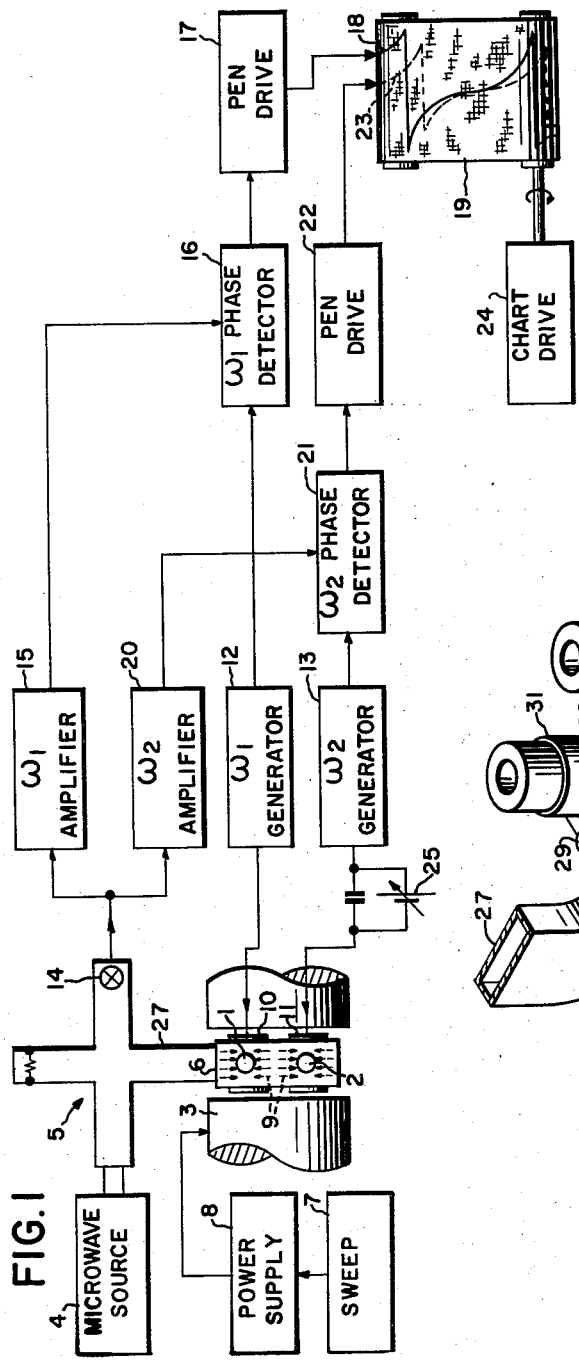
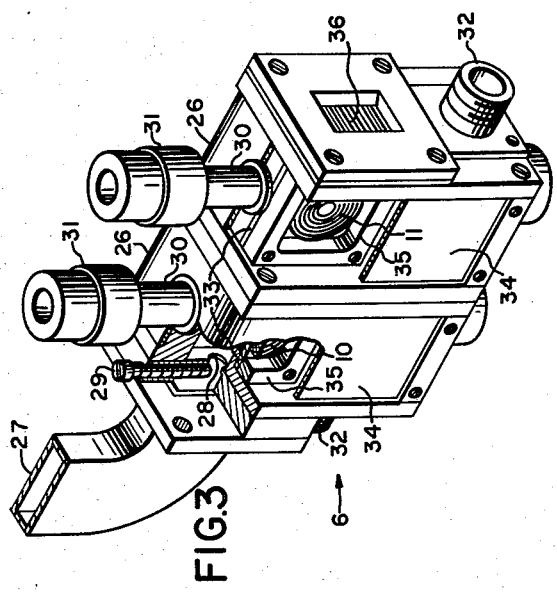
INVENTOR.
JAMES S. HYDE
BY *Wm. J. Nolan*
ATTORNEY 3,197,692
GYROMAGNETIC RESONANCE SPECTROSCOPY
James S. Hyde, Menlo Park, Calif., assignor to Varian Associates, Palo Alto, Calif., a corporation of California
Filed Apr. 2, 1962, Ser. No. 184,285
11 Claims. (Cl. 324—.5)

The present invention relates in general to gyromagnetic resonance spectroscopy, and, in particular, to novel instrumentation techniques for obtaining and displaying resonance signals.

In the art of gyromagnetic resonance spectroscopy, a sample containing gyromagnetic particles is placed in a polarizing unidirectional magnetic field and irradiated with radio frequency energy, signals arising from the resonance absorption of this energy yielding valuable information concerning the sample. A comprehensive treatment of this subject is found in the book "NMR and EPR Spectroscopy," Pergamon Press 1960. When such spectroscopy is performed at microwave frequencies as, for example, in electron paramagnetic resonance experiments, precise comparative measurements of gyromagnetic particle concentration are exceedingly difficult due to sample-dependent errors resulting from changes in such parameters as the cavity match, cavity Q, and microwave phases, of the resonator structure used for irradiating the sample. Also, accurate comparative measurements of the gyromagnetic ratio ($g$ - value) and the hyperfine splitting of samples are difficult owing to overlapping of spectra, non-linearities in spectral scanning, and sample-dependent changes in the resonant frequency of the resonator structure.

A principal object of the present invention is to permit precise quantitative determinations of such properties as the concentration of gyromagnetic particles in a sample, the $g$-value of particles, and the width and splitting of gyromagnetic resonance lines.

One feature of the present invention is the provision of a microwave cavity resonator structure for irradiating two gyromagnetic resonance samples, including means for modulating the polarizing field of each sample at a different frequency, thereby permitting the simultaneous and independent monitoring of signals from each sample under identical cavity excitation conditions.

Another feature of the present invention is the provision of a structure in accordance with the preceding paragraph wherein said modulating means includes two sets of modulated coils mounted on the walls of said resonator, the magnetic field of each set being selectively coupled to a different sample.

Another feature of the present invention is the provision of a structure in accordance with the preceding paragraph including means for applying a D.C. bias to one of said sets of coils.

Still another feature of the present invention is the provision of a gyromagnetic resonance spectrometer having two samples in a common polarizing field including means for selectively displaying the spectrum of each sample as superimposed traces on a dual channel graphic recorder.

These and other features and advantages of the present invention will be more apparent after a perusal of the following specification taken in connection with the accompanying drawings wherein, FIG. 1 is a block diagram of a microwave spectrometer in accordance with the present invention, FIG. 2 is a schematic drawing illustrating the disposition of the microwave magnetic field lines and modulating coils relative to the samples in the cavity resonator of the spectrometer of FIG. 1, and FIG. 3 is an isometric view, partly broken away, of a cavity resonator construction in accordance with the present invention.

Referring now to FIG. 1, a pair of gyromagnetic samples 1 and 2, which for purposes of discussion will be described as solutions containing unpaired electrons, are subjected to the simultaneous influence of the polarizing field of an electromagnet 3 and the microwave field established by microwave source 4 (for example, a reflex klystron oscillator) via microwave bridge 5 and a surrounding rectangular cavity resonator 6. In accordance with well-known practices sweep generator 7, coupled to magnet power supply 8, slowly sweeps the intensity of the polarizing field through a range of values for which gyromagnetic resonance transitions are induced in samples 1 and 2. Alternatively, the frequency of the microwave source 4 may be swept.

The cavity 6 is excited in the $TE_{104}$ mode to set up a magnetic field pattern 9, shown in FIGS. 1 and 2, such that the magnetic field at the location of samples 1 and 2 is maximum and directed substantially at right angles to the polarizing field of magnet 3. The electric field at the sample locations is minimum, thereby minimizing dielectric sample losses. Mounted on opposite walls of the cavity 6 are two sample-straddling sets of coils 10 and 11. Coil set 10 is driven by generator 12 to modulate the intensity of the polarizing field at sample 1 at a frequency $\omega_1$; and coil set 11 is driven by generator 13 to modulate the intensity of the polarizing field at sample 2 at a substantially different frequency $\omega_2$. For example, an $\omega_1$ of 100 kc./s. and an $\omega_2$ of 100 c.p.s. have been used with a microwave field frequency of 9.5 kmc./s. In general, $\omega_1$ and $\omega_2$ need only be separated by an amount greater than the inverse of the response time of the filter circuits customarily used at the output of the phase detectors.

Modulation of the polarizing field results in a corresponding modulation of the impedance of the cavity 6 and hence of the power intercepted by the bridge crystal detector 14. The output of the crystal detector thus contains a component at $\omega_1$ resulting from the modulated resonance of sample 1 and a component at $\omega_2$ resulting from the modulated resonance of sample 2. The $\omega_1$ signal is amplified by amplifier 15 and detected in the usual way by phase sensitive detector 16 to provide a D.C. output which drives the pen mechanism 17 of one channel of a dual channel graphic recorder 19, resulting in a spectral trace 18. Similarly, the $\omega_2$ signal is amplified by amplifier 20 and phase detected by detector 21 to drive the pen mechanism 22 of the second recorder channel, resulting in a superimposed spectral trace 23. A suitable dual channel recorder is Model G-22 commercially available from Varian Associates of Palo Alto, California.

Sample 1 can be a known sample providing a reference signal against which a series of successively-inserted or continuously-flowing samples 2 can be compared, or against which a sample being treated, as by temperature variations or light irradiation, can be compared. The difference between the spectral line intensity of reference sample 1 and the spectral line intensity of the samples 2 provides a determination of the concentration of gyromagnetic particles in the samples 2, this determination being independent of cavity excitation conditions since each sample is substantially equally coupled to the cavity fields. Such a comparison can be made visually by means of the two recorder traces, or, alternatively, any known balancing circuit arrangement can be used for electrically comparing the signals from the two samples.

Another advantageous use for the system of FIG. 1 is to enable an accurate comparison in the hyperfine splitting and line width of the samples. Here a particularly significant feature is that the two traces on the dual channel recorder have exactly the same time (and hence polarizing field) reference governed by the single chart drive mechanism 24. Thus the line splittings and widths from the reference sample trace may be accurately compared to the superimposed trace of the second sample. Similarly, precise comparison of the gyromagnetic ratio of the particles in the two samples can be made by observing the difference in the zero cross-over of the traces.

Further measurement capabilities are provided by the addition of a means 25 for introducing a variable D.C. bias on the one set 11 of modulating coils. In this way a small unidirectional bias field is established at the sample 2 which may be adjusted in intensity so that reference points on the two traces 18 and 23 can be made to exactly coincide. For example, the difference between the separation of the first and second lines, and the separation of the second and third lines in a hyperfine splitting may be accurately determined by using identical samples 1 and 2, but applying sufficient bias field to sample 1 so that its second line coincides with the first line of sample 1. The difference between the subsequent zero cross-overs of the traces gives the desired determination without requiring an extraordinary degree of linearity in the field scan and chart drive. As another example, the amount of current required to superimpose two resonance lines may be measured to give a direct indication of the difference in g-values for the two lines.

Referring to FIG. 3, a suitable construction for the cavity resonator 6 is shown which simply comprises an attached pair of single-sample structure 26 of the type described in detail in copending U.S. Patent Application Serial No. 860,861, filed December 21, 1959, now Patent 3,122,703 and assigned to the same assignee.

A bent waveguide 27 from the bridge 5 is coupled to the cavity 6 via a circular iris 28 provided with a variable loading screw 29. The sample tubes are inserted through cylindrical stacks 30, which appear as waveguides beyond the cut-off at the cavity frequency, and are supported by collet assemblies 31. Coaxial connectors 32 are provided for energizing modulating coils 10 and 11 which are insulatedly cemented on a ceramic plate 33, the interior surface of which has a thin silver plating so that eddy current attenuation of the modulating field is avoided without degradation of the cavity Q. Cover plates 34 are sandwiched between the flanges of the separate single-sample structures 26.

The coils 10 and 11 are seated within an aperture in metallic pressure plates 35 which shield the field of each coil from the sample in the adjacent structure 26 so that the signals at each modulation frequency will arise from only one of the samples.

A slotted cavity wall opening 36 permits the irradiation of sample 2, with ultra-violet light, for example, so that the effect of this irradiation may be monitored relative to sample 1. Similarly a variable temperature accessory as described in the above-cited patent application may be provided to study the effect of temperature variations on sample 2, sample 1 being left at room temperature.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gyromagnetic resonance apparatus comprising: a cavity resonator structure for accommodating simultaneously therein two gyromagnetic samples positioned in a polarizing magnetic field; means for exciting said cavity structure with electromagnetic energy at the resonant frequency thereof, for simultaneous irradiation of said samples at said frequency whereby the magnetic field components of said energy induces gyromagnetic resonance in said samples; means for separately and simultaneously modulating the polarizing field at each sample at respective different frequencies; and means for simultaneously and separately detecting a modulation in the microwave impedance of said cavity resonator structure at each of the modulation frequencies due to gyromagnetic resonance in said samples.

2. The combination of claim 1 including a dual channel graphic recorder, and means, responsive to said detecting means and actuating said recorder, for providing separate superimposed traces of the gyromagnetic resonance spectrum of each sample, said recorder having a single chart drive mechanism whereby said traces have the same time reference.

3. The combination of claim 1 wherein said cavity resonator structure is a rectangular structure adapted for excitation in the $TE_{104}$ mode, said samples being positioned at locations of maximum magnetic field intensity of said mode.

4. The combination of claim 1 wherein said modulating means includes two sets of modulation coils insulatedly supported on the walls of said cavity resonator structure, each set of coils being magnetically coupled to a different one of said samples.

5. The combination of claim 4 further including means for applying a D.C. bias to one of said coil sets to thereby establish a polarizing field bias at the sample coupled thereto.

6. The combination of claim 4 including an apertured plate wherein said coils are seated to confine the magnetic field of each coil to a single sample.

7. A gyromagnetic resonance apparatus as in claim 1, further including means for sweeping the polarizing magnetic field whereby the gyromagnetic spectrum of each sample may be separately and simultaneously derived.

8. A gyromagnetic resonance spectrometer comprising: means for producing a polarizing magnetic field, means for accommodating a pair of gyromagnetic samples simultaneously positioned in said polarizing field, means for irradiating said samples with an alternating magnetic field directed substantially at right angles to said polarizing field for inducing gyromagnetic resonance transitions in said samples, means for sweeping said polarizing magnetic field for obtaining a spectrum of separate and independent gyromagnetic resonance signals from each of said samples, a dual channel graphic recorder, and means, selectively responsive to said signals and actuating said recorder, for providing simultaneously separate superimposed traces of the gyromagnetic resonance spectrum of each sample, said recorder having a single chart drive mechanism whereby said traces have the same time reference.

9. A spectrometer according to claim 8 wherein said irradiating means includes a cavity resonator adapted to accommodate said samples therein simultaneously.

10. A spectrometer according to claim 9 wherein said trace providing means includes two sets of field modulating coils, each set separately straddling a sample, means for energizing each pair of coils at different frequency, and means for selectively detecting a modulation in the impedance of said cavity resonator structure at each of said modulation frequencies.

11. A gyromagnetic resonance spectrometer comprising: means for producing a polarizing magnetic field, means for accommodating a pair of gyromagnetic samples simultaneously positioned in said polarizing field, means including a cavity resonator adapted to accommodate the samples simultaneously therein irradiating said samples with an alternating magnetic field directed substantially at right angles to said polarizing field for inducing gyromagnetic resonance transitions in said samples, said cavity resonator being rectangular and adapted for excitation in the $TE_{104}$ mode, the samples being positioned at locations of maximum magnetic field intensity of such mode, means sweeping at least one of said magnetic fields for obtaining a spectrum of gyromagnetic resonance signals from each of said samples, a dual channel graphic recorder, two sets of field modulating coils, each set separately straddling a sample, means for energizing each pair of coils at a different frequency, means for selectively detecting a modulation in the impedance of said cavity resonator structure at each of said modulation frequencies, means selectively responsive to the detected modulations actuating said recorder for providing separate superimposed traces of the gyromagnetic resonance spectrum of each sample, said recorder having a single chart drive mechanism whereby said traces have the same time reference.

References Cited by the Examiner

UNITED STATES PATENTS

| | | | |
|---|---|---|---|
| 2,962,585 | 11/60 | Bolef et al. | 330—4 |
| 3,100,866 | 8/63 | Zimmerman et al. | 324—0.5 |

OTHER REFERENCES

Buckmaster, Canadian Journal of Physics, vol. 34, No. 7, July 1956, pp. 711 to 721 incl.

Feher et al.: Physical Review, vol. 98, No. 2, Apr 15., 1955, pp. 337 to 348 incl.

Llewellyn et al.: Journal of Scientific Instruments, vol. 34, June 1957, pp. 236 to 239.

Mock, Review of Scientific Instruments, vol. 31, No. 5, May 1960, pp. 551 to 555 incl.

Pople et al.: High Resolution Nuclear Magnetic Resonance, McGraw-Hill Book Co., Inc., New York, 1959, pp. 74, 75, and 76 relied on.

CHESTER L. JUSTUS, *Primary Examiner.*

MAYNARD R. WILBUR, *Examiner.*